C. E. HELKE.
FRUIT JAR CAP STRAIGHTENER.
APPLICATION FILED MAY 18, 1912.

1,083,444.

Patented Jan. 6, 1914.

Inventor
Charles E. Helke

Witnesses
Philip A. H. Ferrell
Margaret E. O'Keane

By Geo. W. Sues
Attorney

UNITED STATES PATENT OFFICE.

CHARLES E. HELKE, OF PORT EDWARDS, WISCONSIN.

FRUIT-JAR-CAP STRAIGHTENER.

1,083,444.     Specification of Letters Patent.     Patented Jan. 6, 1914.

Application filed May 18, 1912. Serial No. 698,097.

*To all whom it may concern:*

Be it known that I, CHARLES E. HELKE, a citizen of the United States, and a resident of Port Edwards, in the county of Wood and State of Wisconsin, have invented certain new and useful Improvements in Fruit-Jar-Cap Straighteners, of which the following is a specification, reference being had to the accompanying drawings.

This invention relates to a household novelty, and comprises a fruit jar cap edge straightener.

The object of my invention is to provide a light, neat, inexpensive and readily operated device, by means of which the bent edges of a fruit jar cap can be straightened, with ease, accuracy and despatch.

With these and other objects in view, the present invention consists in the combination and arrangement of parts as will be hereinafter more fully described and finally pointed out in the appended claims, it being further understood that changes in the specific structure shown and described may be made within the scope of the claims without departing from the spirit of the invention.

Figure 1:
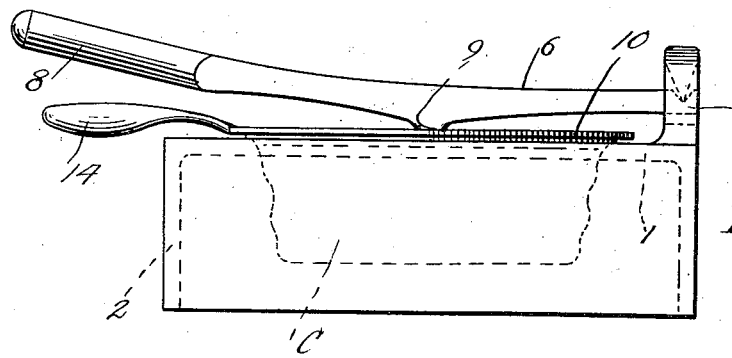
Figure 2:
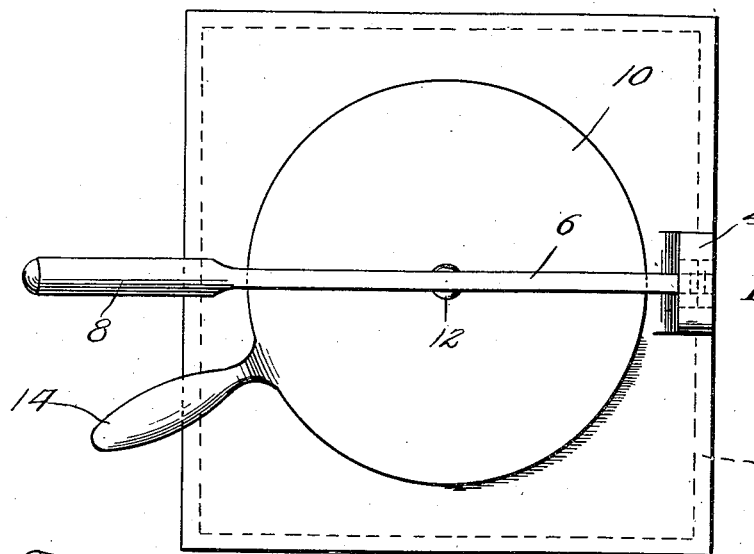
Figure 3:
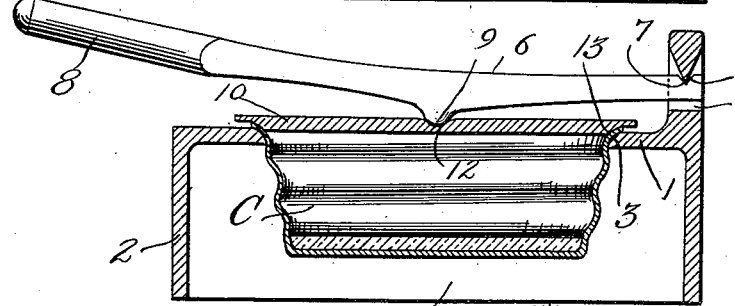

In the accompanying drawings forming a part of this specification and in which like numerals of reference indicate similar parts in the several views: Figure 1, shows an elevational view of a cap edge straightener embodying my invention. Fig. 2, is a top view. Fig. 3, is a central sectional view, showing a cap in position.

It is often found that properly prepared preserves and fruit contained within the usual glass fruit jars provided with metal sealing caps, is spoiled. An investigation will invariably disclose, that the edge of the metal cap has a dent or is bent, so that the edge does not fully and properly pack upon the rubber ring always placed below the cap edge. The jar caps are made of thin easily bent metal and in my present invention I provide a simple device by means of which the cap edges can be easily straightened should they become bent to insure an air tight connection between the jar and cap edges, preventing the spoiling of the jar contents.

In carrying out the aim of my invention, I employ a plate 1, having the supporting flanges 2, the outwardly splayed opening 3, to provide a rounded edge and the centrally positioned upstanding ear 4. This ear 4, has the upper inwardly directed knife edge 5, shown in Fig. 3. Arranged for co-action with the ear is an operating lever 6, which at one end has the kerf 7, and a handle 8, at the opposite end, and the centrally positioned snug 9. Arranged for co-action with the splayed opening 3, is the disk 10, having the centrally positioned depression 12. The rounded edge 13, is arranged for co-action with the rounded splayed edge 3, of the plate 1. The disk 10, is provided with an extending handle 14, so that this disk may be given a rocking rotary motion.

In order to straighten a cap edge it is simply necessary to place the same into the splayed opening 3, in the manner shown in Fig. 3, place the disk 10, in position, insert the lever and then press down on the lever as well as impart a rotary movement to the disk. It will often be found that the mere pressure on the lever will straighten out the dents, though where the indentation within the cap edge is deep it will be found an advantage to rock the disk in smoothing down the edge. These jar caps C, are made in different sizes and it is of course understood that I have a special straightening plate 1, for each size of caps. These plates can be made of any suitable material and are simple and inexpensive as well as durable and efficient in operation.

Having thus described my said invention, what I claim as new and desire to secure by United States Letters Patent is:

1. A holder having a splayed opening and an upstanding apertured ear with an upper inwardly directed knife edge, of a flange disk arranged for co-action with said opening having a centrally positioned depression, and a lever having a kerf at one end for engagement with said knife edge and a snug to engage said depression.

2. A holder having a splayed opening and an upstanding apertured ear, a flanged disk arranged for co-action with said splayed opening, and a lever arranged to engage said apertured ear and said disk as and in the manner set forth.

3. A holder having a splayed opening and an upstanding apertured ear with an apertured inwardly directed knife edge of a flanged disk arranged for co-action with said splayed opening having an outstanding handle, and a lever having a kerf at one end for engagement with said ear and a snug to engage said disk.

In testimony whereof I affix my signature, in presence of two witnesses.

CHARLES E. HELKE.

Witnesses:
HERMAN H. HELKE,
HENRY E. FITCH.

Copies of this patent may be obtained for five cents each, by addressing the "Commissioner of Patents, Washington, D. C."